No. 687,639. Patented Nov. 26, 1901.
E. A. MAINGUET.
CUTTING APPARATUS.
(Application filed Mar. 28, 1901.)
(No Model.)
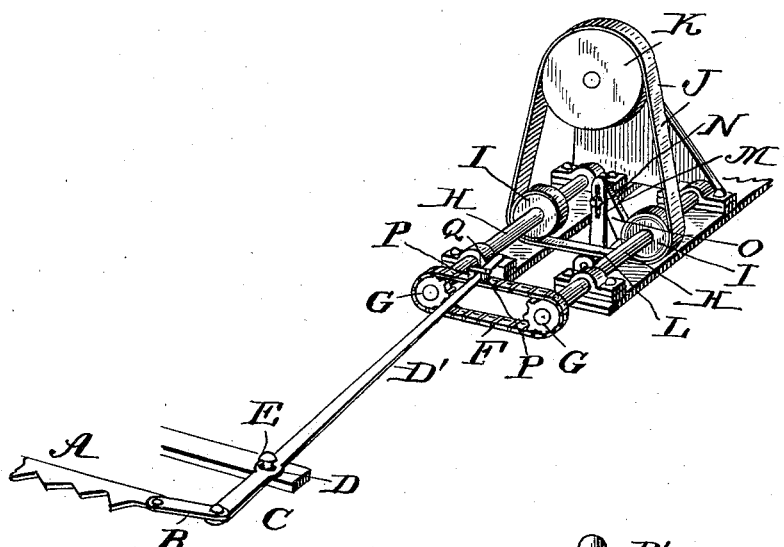
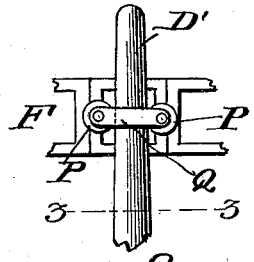
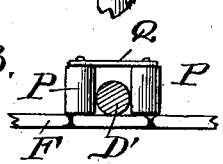
WITNESSES:
Jos. A. Ryan
Perry B. Turpin
INVENTOR
Edward A. Mainguet
BY
ATTORNEYS

UNITED STATES PATENT OFFICE.

EDWARD A. MAINGUET, OF EVANGELINE, LOUISIANA.

CUTTING APPARATUS.

SPECIFICATION forming part of Letters Patent No. 687,639, dated November 26, 1901.

Application filed March 28, 1901. Serial No. 53,230. (No model.)

*To all whom it may concern:*

Be it known that I, EDWARD A. MAINGUET, a citizen of the United States, residing at Evangeline, in the parish of Acadia and State of Louisiana, have made certain new and useful Improvements in Cutting Apparatus, of which the following is a specification.

My invention is an improvement in cutting apparatus designed especially for use on reaping-machines; and the invention consists in certain novel constructions and combinations of parts, as will be hereinafter described, and pointed out in the claims.

In the drawings, Figure 1 is a perspective view of the apparatus embodying my invention. Fig. 2 is a detail top plan view of a portion of the chain, showing the rollers thereon and a portion of the lever projecting between the same; and Fig. 3 is a detail sectional view on about line 3 3 of Fig. 2.

The cutter-bar A may be of any suitable construction and supported and guided in any well-known manner. This cutter-bar A is connected by a pitman B with one arm C of a lever D, which lever is pivoted at E, with its short arm connected to the cutter-bar and its long arm extended and arranged for operation by the devices presently described. An endless chain F is passed around drive-sprockets G, which are secured on the parallel shafts H, which are suitably journaled and provided also with band-pulleys I of a small diameter. A belt J is passed around the pulleys I and the driving-pulley K and is arranged for engagement by a tightening-pulley L, carried by a bar M, which is slotted to receive the bolt N, by which it is connected to the support O, so the tightener can be adjusted as desired. By this means it will be noticed the sprockets G will be rapidly revolved and cause the chain F to move at a high speed. The lever D has its arm D' arranged for operation by the chain F, this being preferably accomplished by providing on the outer side of said chain projecting journaled rollers P, which lie on opposite sides of the arm D' of the lever and cause the said lever to travel with the chain. By preference the rollers P are connected at their outer ends by a cross-bar Q to prevent any displacement of the lever. It will be noticed that in operation as the chain moves around its drive-sprockets the lever travels with it, the pivoted E being so formed as to permit the passage of the lever with the chain as the latter rounds its drive-sprockets.

I prefer in practice to employ the belt J for driving the sprockets G, whereby the said sprockets are driven evenly and smoothly, and the belt may slip in case of unusual stress to prevent breakage of the parts in case the cutter-bar should meet an unyielding obstruction.

Manifestly any suitable form of frame may be employed for carrying the operating parts.

It will be understood that in operation the operating-arm D' of the lever D has a limited longitudinal play or motion between the rollers P, and it is also moved laterally by the said rollers as the chain is driven by its operating devices.

Having thus fully described my invention, what I claim as new, and desire to secure by Letters Patent, is—

1. In a cutting apparatus, substantially as described, the combination of the cutter-bar, the lever engaged with said bar and having an operating-arm, an endless chain having on its outer side a pair of projecting rollers between which the operating-arm of the lever extends, the shafts having sprocket-wheels for supporting and driving said chain, the pulleys on said shafts, the drive-pulley, a drive-belt passed around said drive-pulley and the pulleys on the shaft, the tightener engaging said belt, and suitable supporting-framing, substantially as set forth.

2. In a cutting apparatus substantially as herein described, the combination of the cutter-bar, the endless chain, the drive-sprockets around which said chain is passed, means for driving said sprockets, and the lever connected with the cutter-bar and having its operating-arm connected with and arranged for operation by the endless chain, substantially as set forth.

3. The combination of the endless chain provided on its outer side with projecting rollers, means for supporting and driving said chain, the cutter-bar, and the lever connected with the cutter-bar and having its operating-arm extended between the rollers of the endless chain and arranged to play longitudinally between said rollers and to be moved laterally thereby as the chain is moved by its operating mechanism, substantially as set forth.

EDWARD A. MAINGUET.

Witnesses:
M. H. PICKARD,
JEAN GAY.